Nov. 24, 1936.　　　R. L. MARCHFIELD　　　2,061,711
VEGETABLE SLICING DEVICE
Filed May 21, 1935　　　2 Sheets-Sheet 1

Inventor
Rudolph L. Marchfield
By Clarence A. O'Brien
Attorney

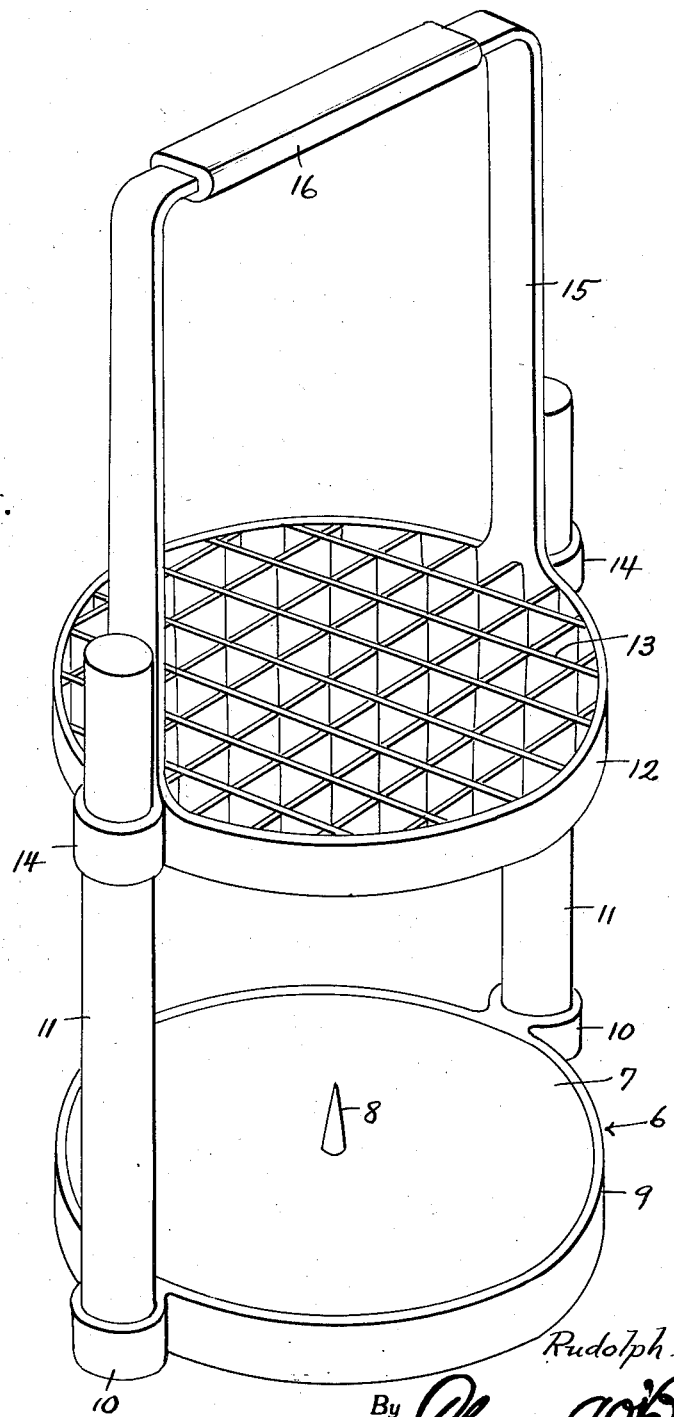

Patented Nov. 24, 1936

2,061,711

UNITED STATES PATENT OFFICE 2,061,711

VEGETABLE SLICING DEVICE

Rudolph L. Marchfield, Chicago, Ill.

Application May 21, 1935, Serial No. 22,619

3 Claims. (Cl. 146—147)

This invention relates to that classification which embodies kitchen utensils and analogous accessories and it has more specific reference to a device or appliance expressly designed for cutting or slicing vegetables, said device being expressly made for the purpose of severing a potato into slices to facilitate making so-called French fried potatoes.

Briefly, the preferred embodiment of the invention comprises a base having standards or uprights rising therefrom and serving as guides for a yoke-equipped slicing unit.

More specifically the invention has reference to a structure of the aforesaid character which also includes as a part thereof a clustering attachment, that is a means which is applicable to the slicing unit for the purpose of assembling and holding the slices in a bunch to expedite handling.

My primary aim is to generally improve upon prior inventions in this classification by providing an improved structural arrangement characterized by appreciable novel characteristics and ingenious refinements, which it is believed, are more aptly fitted to serve in the capacity stated.

Other features and advantages will become more readily apparent from the following description and drawings.

In the drawings:

Figure 5 is a perspective showing of a different embodiment of the invention possessing somewhat the same fundamental ideas and principles as illustrated in the form shown in Figure 1.

Figure 1:
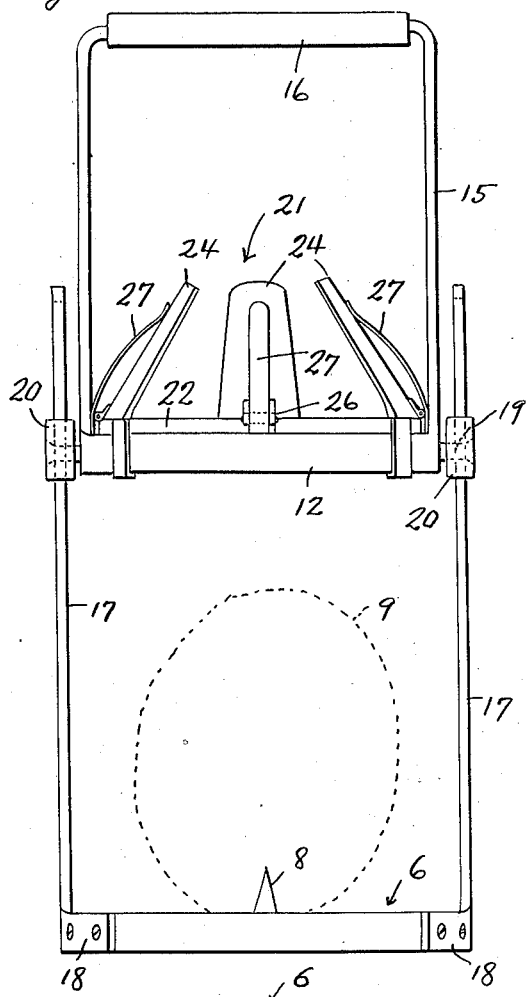
Figure 1 is an elevational view showing one embodiment of the invention as constructed in accordance with my version and ideals, and illustrating the gathering and slice bunching attachment in place.
Figure 2:
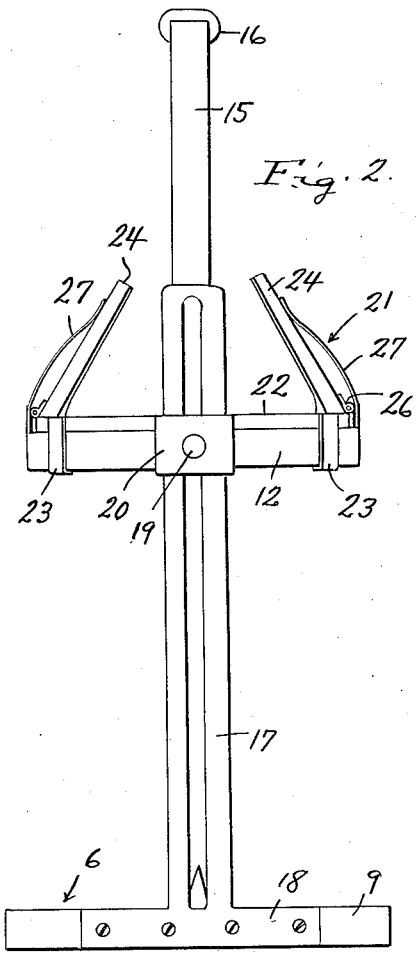
Figure 2 is an elevational view at right angles to Figure 1 observing it in a direction from left to right.

Due to its utmost simplicity I will describe first the embodiment of the invention shown in Figure 5, this being substantially generically the same as the corresponding features shown in the other form of the invention in Figures 1 and 2. First there is a suitable base and this is denoted by the numeral 6 and comprises a wooden disk or bottom 7 having a central tapered pin 8 which serves as a spur for holding the potato or other vegetable 9 in place as indicated in dotted lines in Figure 1. Surrounding and bounding the marginal edge of this disk is a metal band 9 which serves as a protective rim and which also constitutes a support in that it is provided with outstanding diametrically opposed eyes 10. Rods 11 are secured in and rise from these eyes in spaced parallelism and function as standards or uprights, such as they may be alternatively referred to. The relatively movable slicing unit comprises a circular frame or ring 12 of the same diameter as the rim 9 and this is provided with a suitable lattice-type cutting grid 13. This forms a sort of a honeycomb cutter which when brought down on the potato serves to slice it into more or less uniform pieces or slices. The ring 12 is provided with guide eyes 14 vertically slidable on the standards 11 and is also provided with a U-shaped bail or yoke 15 which serves as a convenient handle, the bight portion of this having an appropriate hand grip 16. The base shown in Figures 1 and 2 is the same as that already described and is therefore indicated by the numeral 6 and includes a wooden disk surrounded by a marginal rim 9. In this arrangement however, the uprights 17 are in the form of slotted flat strips and provided at their lower ends with attaching elements 18 properly curved and fastened to the rim 9. Incidentally, it would be practicable in some instances (not shown) to directly attach the heads or members 18 directly to the block 6. The cutter unit here shown is also similar to that already described.

Figure 3:
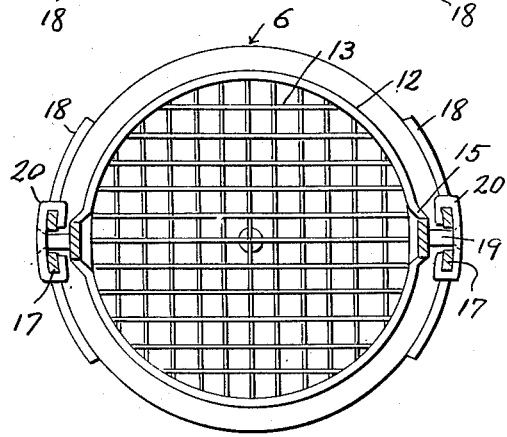
Figure 3 is a horizontal section with the attachment removed.

The cutter unit comprises the aforementioned ring 12, the U-shaped bail or handle 15 and the hand grip 16. It is also provided with the same honeycomb grid 13. In this modification however, the ring 12 is provided with diametrically arranged studs 19 attached to sliding fixtures or brackets 20, said fixtures 20 being in the form of simple clips as shown in Figure 3 having hooks slidably engageable with the edge portions of the uprights 17. This allows the studs 19 to project through the slots in said uprights 17.

The gathering and bunching attachment is denoted by the numeral 21 and is of proper material. It preferably comprises an annulus 22 of a diameter corresponding to the ring 12. This annulus is provided with fixed L-shaped hooks 23 which fasten on said ring 12 to hold the annulus firmly attached to the ring. Incidentally, the hooks 23 are sufficiently resilient to permit them to be readily released or snapped into place. The attachment also includes a plurality of upstanding equi-distant circumferentially spaced grips or fingers 24. These so-called fingers are more or less in the nature of plates which are transversely curved and longitudinally tapered, the base portion 25 thereof being fashioned to seat firmly on the annulus and being hingedly mounted in place as indicated at 26. This limits the inward swinging movement but allows the fingers to freely swing outwardly to accommodate the expansible group or bunch of potato slices. The fingers are pressed inwardly and held in normal set position by longitudinally bowed and properly anchored springs 27. These springs are fastened on the hinges and have their free ends bearing against the tapered or narrow ends of the fingers 24.

Figure 4:
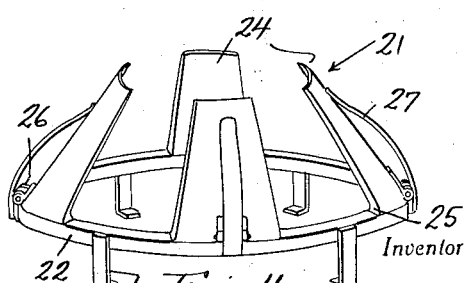
Figure 4 is a perspective illustration of the attachment per se.

The gist of the attachment idea is to provide a simple accessory 21 as shown in Figure 4 which is easily applicable and removable so that it may be employed whenever desired. Its purpose is to provide a handy and economical means, whereby the slices of the potato may be bunched or assembled together and held in this compact relationship after they have been cut so as to expedite handling. It is evident however, that these hinged spring pressed bunching elements or fingers 24 might well be formed as a part of the cutter ring 12.

Novelty is thought to reside in the provision of the central spur equipped base or disk 7 with the protective ring 9 which base is provided with uprights or standards to slidably accommodate the vertically movable cutter unit. For a generic consideration, novelty is also thought to reside in the cutter arrangement comprising the simple ring 12 and cutting blades 13 arranged in suitable form, the U-shapped handle and the fixtures for slidably connecting the ring 12 with the uprights.

In both forms of the invention, the structural assemblage is such as to promote stability, ease of operation, efficiency and economy to both the manufacturer and the user. In fact, all of the parts have been carefully selected and mechanically coordinated to carry into effect, in a feasible and practicable manner, my various aims and purposes.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details coming within the field of invention claimed may be resorted to in actual practice, if desired.

Having thus described the invention, what is claimed as new is:

1. In a structural assemblage of the class described, a circular base, a pair of diametrically opposed guiding and assembling uprights attached to and rising from said base, a cutting grid including cutting elements and diametrically opposed guide elements slidable on said uprights, an operating bail connected to said cutting device, a slice-gathering and bunching attachment comprising an annulus seated on said cutter ring and provided with resilient clips releasably engageable with the ring, a plurality of upstanding circumferentially spaced, equi-distant retention fingers hingedly mounted on said annulus and disposed in converging relationship, coacting means between the hinged ends of the elements and annulus to limit inward swinging movement thereof, and individual flat springs mounted on the annulus and having their free end portions engageable with the swingable free end portions of said retention fingers.

2. In a vegetable slicing device of the class described, a circular base, a pair of substantially T-shaped inverted units, said units being disposed diametrically opposite each other and having their headed lower ends of arcuate formation and fastened to the marginal portion of said base, the stem portions thereof rising vertically above the base and being formed with vertical guide slots, a frame structure including a ring-like member provided with an open-work cutting grid, and a handle-forming bail, said ring-like member being provided with outstanding studs slidable in said slots, and hooked grips carried by said studs and slidably engaged with the slotted guide stems.

3. As a component part of a structural assemblage of the class described, and as a new article of manufacture, a slice-gathering and bunching attachment comprising an annulus provided with a plurality of depending circumferentially spaced attaching resilient clips adapted for engagement with a supporting ring, a plurality of upstanding circumferentially spaced equi-distant retention fingers hingedly mounted on said annulus to swing outwardly, the inward swinging movement being limited by the direct bearing contact of the hinged ends with said annulus, and individual flat springs attached to the hinges and cooperable with said fingers to maintain them in inwardly converging bunching and gripping relationship.

RUDOLPH L. MARCHFIELD.